United States Patent
Amatucci

[19]

[11] Patent Number: 5,932,374
[45] Date of Patent: Aug. 3, 1999

[54] LITHIUM MAGNESIUM MANGANESE OXY-FLUORIDES FOR LI-ION RECHARGEABLE BATTERY ELECTRODES

[75] Inventor: Glenn G. Amatucci, Raritan, N.J.

[73] Assignee: Telcordia Technologies, Inc., Morristown, N.J.

[21] Appl. No.: 08/985,045

[22] Filed: Dec. 4, 1997

[51] Int. Cl.$^6$ .................................................. H01M 4/50
[52] U.S. Cl. .......................... 429/224; 423/464; 423/599; 423/641
[58] Field of Search ..................... 423/464, 605, 423/599, 635, 641; 429/224

[56] References Cited

U.S. PATENT DOCUMENTS

| | | | |
|---|---|---|---|
| 5,674,645 | 10/1997 | Amatucci et al. | 429/224 |
| 5,702,674 | 12/1997 | O'Young et al. | 423/50 |
| 5,759,720 | 6/1998 | Amatucci | 429/224 |

FOREIGN PATENT DOCUMENTS

| | | | |
|---|---|---|---|
| 7-37617 | 2/1995 | Japan | H01M 10/40 |
| 7-254403 | 10/1995 | Japan | H01M 4/02 |
| 8-171900 | 7/1996 | Japan | H01M 4/02 |
| 10-334918 | 12/1998 | Japan . | |

OTHER PUBLICATIONS

Xia et al., "Studies on Li–Mn–O spinel system . . . ", J. Power Sources, vol. 24, pp.24–28 (No month available), 1998.

LeCras et al., "Lithium intercalation in Li–Mg–Mn–O and Li–Al–Mn–O spinels", Solid State Ionics, vol. 89, pp. 203–213 (no month available), 1996.

*Primary Examiner*—Maria Nuzzolillo
*Assistant Examiner*—Carol Chaney
*Attorney, Agent, or Firm*—Joseph Giordano; David A. Hey; Elizabeth Ann Mark

[57] ABSTRACT

The cycling stability and capacity of Li-ion rechargeable batteries are improved, particularly in an elevated temperature range of about 55° C., by the use of lithium magnesium manganese oxy-fluoride electrode components having the general formula, $Li_{1+x}Mg_yMn_{2-x-y}O_{4-z}F_z$, where $x \leq 0.2$, $0.1 \leq y \leq 0.3$, and $0.01 \leq z \leq 0.5$.

6 Claims, 2 Drawing Sheets

LITHIUM MAGNESIUM MANGANESE OXY-FLUORIDES FOR LI-ION RECHARGEABLE BATTERY ELECTRODES

BACKGROUND OF THE INVENTION

The present invention relates to lithium manganese oxide intercalation compounds useful as active electrode materials in Li-ion rechargeable batteries and, particularly, to oxyfluoride complexes of magnesium-substituted manganese oxides and their use to improve the cycling stability and capacity of such batteries.

Lithium manganese oxide intercalation compounds, nominally $LiMn_2O_4$, have been increasingly proven to be effective and economical materials for the fabrication of secondary, rechargeable Li-ion electrolytic cells and composite batteries. Successful batteries of this type are described in U.S. Pat. Nos. 5,296,318 and 5,460,904. These batteries exhibit an admirable level of electrical storage capacity and recharge cycling stability over a wide range of voltages; however, these properties have not been considered entirely satisfactory to meet the increasingly stringent requirements of modern electronic equipment and applications.

Extensive investigations have been undertaken to improve these noted properties, and such works have resulted in determinations that variations in the structural parameters of the $LiMn_2O_4$ spinel, for example, the a-axis lattice dimension of the compound, contribute significantly to ultimate cell performance. Such structural parameters have in turn been found to depend to a great extent upon the constitution of the intercalation compound and upon the conditions of its synthesis. Recently, in U.S. Ser. No. 08/706, 546, filed Sep. 6, 1996, now U.S. Pat. No. 5,675,645, incorporated herein by reference, Amatucci at el. achieved extraordinary improvement in capacity capabilities and cycling stability through the anionic fluorine substitution of lithium manganese oxide intercalation electrode compounds, including such compounds in which the manganese oxides were cationically-substituted in part with transition metal ions.

Further investigations into other cationic substitutions in the fluoro-substituted lithium manganese oxide structure led to the improved battery capacity and cycling characteristics, particularly at elevated temperature, described by Amatucci in U.S. Ser. No. 08/868,553, filed Jun. 4, 1997. There the substitution of a portion of the manganese with lighter aluminum, as in a general formula $Li_{1+x}Al_yMn_{2-x-y}O_{4-z}F_z$, effected a distinct improvement in the theoretical capacity of resulting electrolytic cells, and contributed significantly to the stabilization of such capacity over extended high-temperature cycling. The present invention derives from the yet further discovery that the cationic substitution of magnesium in oxy-fluoride lithium manganese oxide intercalation compounds, as in a general formula $Li_{1+x}Mg_yMn_{2-x-y}O_{4-z}F_z$, profoundly improves the stability of cell capacity during long-term recharge cycling in elevated temperature ranges, i.e., about 55° C.

SUMMARY OF THE INVENTION

In the investigations underlying the present invention, it has been found that anionic substitution with fluorine in lithium manganese oxide cell electrode intercalation materials is effective in improving the performance not only of materials obtained with the basic-structured $LiMn_2O_4$ and its transition metal-substituted complexes, but also materials derived from cationic aluminum substitution for manganese in the spinel, particularly with respect to high-temperature cycling stability.

Intercalation materials that may be effectively employed in the present invention to achieve the noted improvements over prior electrolytic cells are represented in the general formula, $Li_{1+x}Mg_yMn_{2-x-y}O_{4-z}F_z$, where $x \leq 0.2$, $0.1 \leq y \leq 0.3$, and $0.01 \leq z \leq 0.5$. Preparation of these advantageous magnesium-substituted oxy-fluoride spinel derivatives may most simply follow the usual practice, such as noted in Tarascon, U.S. Pat. No. 5,425,932 and earlier-mentioned Amatucci et al., of annealing at about 800° C. stoichiometric mixtures of appropriate precursor compounds, typically MgO, $Li_2CO_3$, LiF, and $MnO_2$.

Series of oxy-fluoride compounds varying primarily in y and z formula components, i.e., Mg and F, were examined by x-ray diffraction analysis to determine the resulting a-axis lattice parameters and were used to prepare battery cell positive electrode compositions which were then incorporated into test cells in the usual manner, as described in the incorporated disclosure of Amatucci et al. The cells were subjected to repeated charge/discharge cycling to determine the effect of compound constitution on the level of electrical storage capacity exhibited by the cells, generally as mAhr/g of electrode compound, as well as on cycling stability, i.e., the ability to maintain the initial level of capacity over extended cycling, not only at room temperature, but on into a high-stress temperature range of about 55° C.

BRIEF DESCRIPTION OF THE DRAWING

The present invention will be described with reference to the accompanying drawing of which.

DESCRIPTION OF THE INVENTION

In accordance with the following examples, intercalation materials of the present invention, as well as comparative samples of earlier-investigated Al-substituted and unsubstituted compounds, were prepared in the manner described in the aforementioned U.S. Pat. No. 5,425,932, using stoichiometric mixtures of the primary precursor compounds, and were tested as active components of positive secondary cell electrodes. For example, a $Li_{1+x}Mn_2O_4$ spinel employed in prior practices (according to present formula designation, $Li_{1+x}Mg_yMn_{2-x-y}O_{4-z}F_z$, where $y=0$ and $z=0$) was prepared for use as a performance control by annealing 9.70 parts by weight of $Li_2CO_3$ and 42.38 parts of $MnO_2$ to obtain an optimally preferred $Li_{1.05}Mn_{1.95}O_4$ compound. Test cells of the samples were prepared and tested in galvanostatic and potentiostatic studies, generally as described in the above-noted patent specification. Such test cells comprised lithium foil negative electrodes as a practical expedient, since experience has confirmed that performance results achieved in this manner are objectively comparable to those obtained with Li-ion cell compositions described in the earlier-referenced patent specifications.

EXAMPLE 1

In a typical preparation of an intercalation material of the present invention, stoichiometric proportions of the precursors, $MnO_2$ (EMD-type), $Li_2CO_3$, $MgO$, and $LiF$, were thoroughly mixed in an agate mortar and pestle in a weight ratio of 20.06:3.32:1.03:1, and the mixture was annealed in air in an alumina crucible in the manner of the control sample to obtain a nominal test composition of $Li_{1+x}Mg_yMn_{2-x-y}O_{4-z}F_z$, where x=0, y=0.2, and z=0.3 ($Li_{1.0}Mg_{0.2}Mn_{1.8}O_{3.7}F_{0.3}$). Specifically, the mixture was heated at a regular rate over a period of about 12 hours to a temperature of 790° C. at which it was maintained for about 12 hours. The sample was then cooled to room temperature at a regular rate over a period of about 24 hours. After a mix/grinding, the sample was reheated over a period of 5 hours to 790° C. where it was held for about 12 hours before being finally cooled to room temperature over a period of about 24 hours. The resulting magnesium manganese oxyfluoride compound was characterized by CuKα x-ray diffraction (XRD) examination which showed clearly-defined peaks confirming a well-crystallized, single-phase product of the synthesis.

EXAMPLE 2

A series of magnesium manganese oxy-fluoride compounds of the present invention, plus a non-fluorinated control, was prepared in the foregoing manner with appropriate combinations of precursor compounds to yield spinels of the formula $Li_{1+x}Mg_yMn_{2-x-y}O_{4-z}F_z$, where x=0, y=0.1, and z=0, 0.20, 0.30, and 0.50. The resulting samples were characterized by XRD from which the respective a-axis lattice parameters were calculated.

EXAMPLE 3

Figure 1:
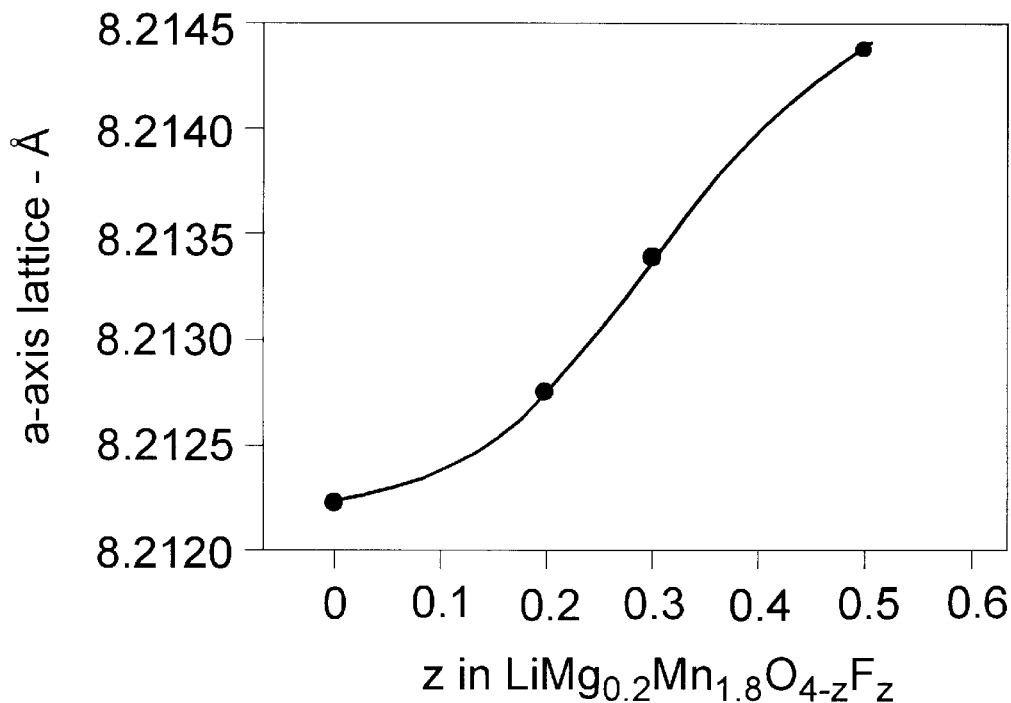
FIG. 1 is a graph of a-axis lattice dimensions v. z of invention compounds, $Li_{1+x}Mg_yMn_{2-x-y}O_{4-z}F_z$, where $x=0$, $y=0.2$, and $z \leq 0.5$.

A second series of samples of variant composition was similarly prepared with appropriate combinations of precursor compounds to yield spinels of the formula $Li_{1+x}Mg_yMn_{2-x-y}O_{4-z}F_z$, where x=0, y=0.2, and z=0, 0.20, 0.30, and 0.50. The resulting samples were characterized by XRD from which the respective a-axis lattice parameters were likewise calculated. A plot of these latter parameter dimensions as shown in FIG. 1 indicates the regular increase which tracks and is indicative of the increase in fluorine substitution. Throughout the indicated levels of variants, however, the materials of the invention exhibit a-axis dimensions well within the desirable range of less than about 8.23 Å.

EXAMPLE 4

Figure 2:
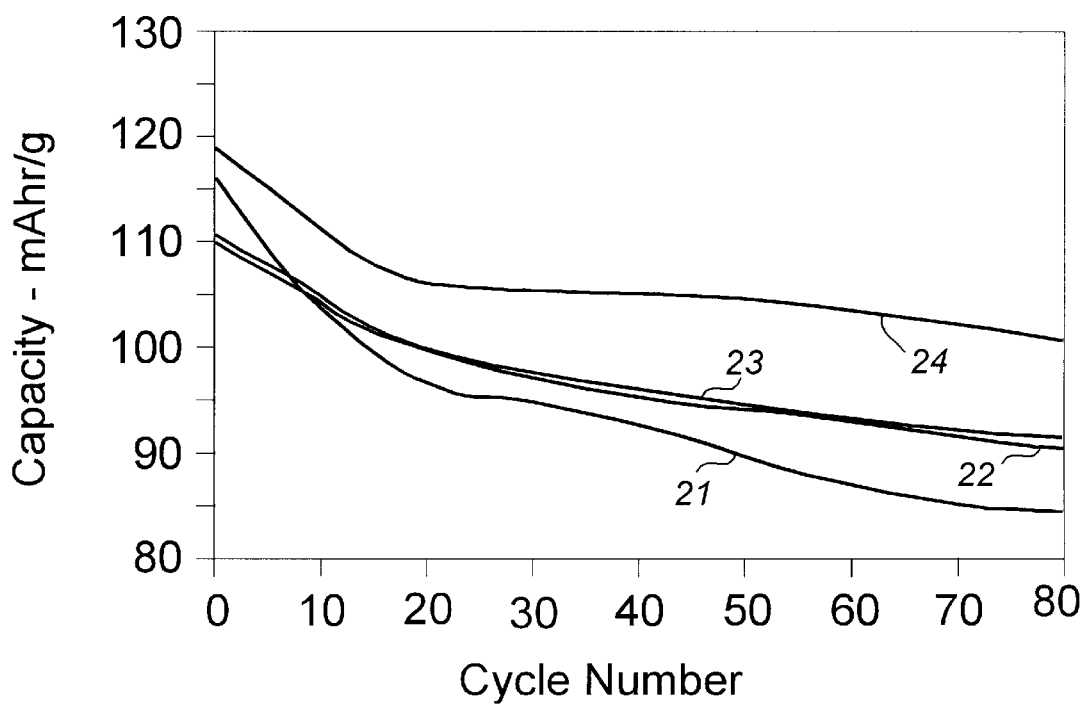
FIG. 2 is a graphic comparison of capacity and elevated temperature cycling stability v. number of charging cycles for cells comprising a prior $Li_{1.05}Mn_{1.95}O_4$ electrode compound and $Li_{1+x}Mg_yMn_{2-x-y}O_{4-z}F_z$ compounds of the present invention, where $x=0$, $y=0.1$, and $z \leq 0.5$.

Portions of a control standard $Li_{1.05}Mn_{1.95}O_4$ and of the samples of $Li_{1.0}Mg_{0.1}Mn_{1.9}O_{4-z}F_z$, where z varies at 0, 0.2, and 0.5, prepared in Example 2 were individually incorporated with about 10% conductive carbon and 5% polyvinylidene fluoride binder and cast from a solvent vehicle onto an aluminum foil substrate to provide upon drying, preferably in a nitrogen atmosphere, positive test cell electrodes. Arranged in the usual manner with a lithium foil electrode and intervening glass fiber separator saturated with a 1 M electrolyte solution of $LiPF_6$ in a 2:1 mixture of ethylene carbonate:dimethyl-carbonate, the sample electrodes formed test cells which were subjected to elevated temperature (55° C.) charge/discharge cycling over the range of 3.4–4.5 V at a C/5 rate (full cycle over 5 hours). The capacity of each cell was traced during a period in excess of about 80 cycles to provide an indication, as seen in FIG. 2, of the extent of change of that property, i.e., the cycling stability of the cell, with protracted recharging. Traces 21–24 reflect the results from the control standard (21) and the above-noted magnesium substitution and the increasing levels of fluorine substitution, z, from 0 to 0.5 (22–24).

EXAMPLE 5

Figure 3:
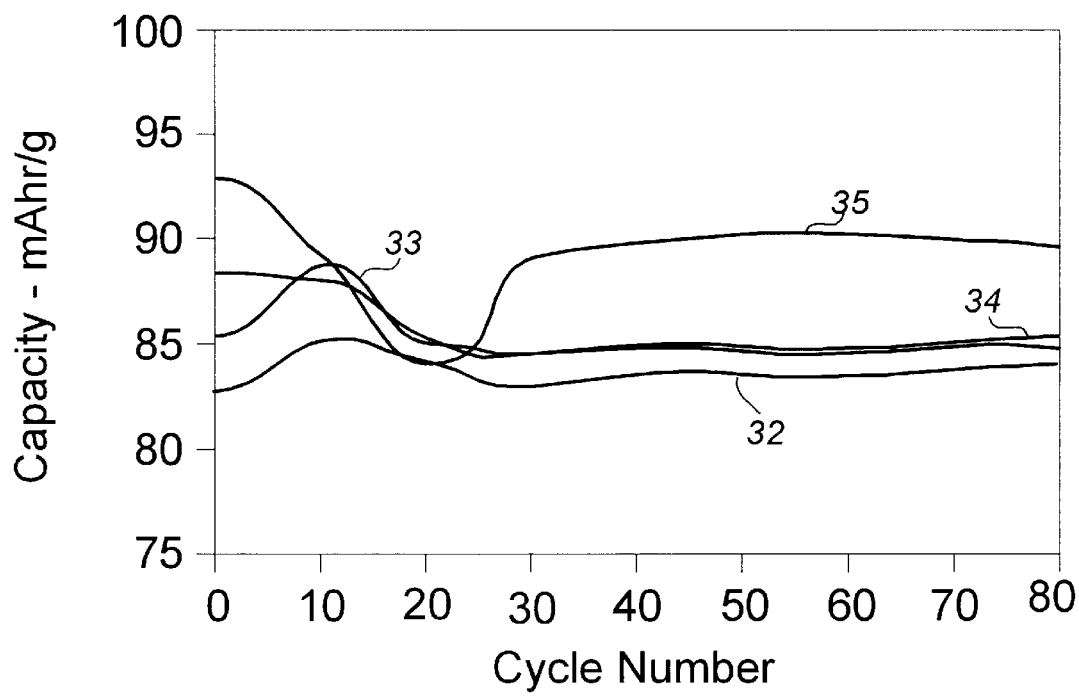
FIG. 3 is a graphic comparison of capacity and elevated temperature cycling stability v. number of charging cycles for cells comprising $Li_{1+x}Mg_yMn_{2-x-y}O_{4-z}F_z$ compounds of the present invention, where $x=0$, $y=0.2$, and $z \leq 0.5$.

Portions of the samples of $Li_{1.0}Mg_{0.2}Mn_{1.8}O_{4-z}F_z$, where z varies at 0, 0.2, 0.3, 0.5, prepared in Example 3 were similarly incorporated into test cells and subjected to extended cycling. As seen from the traced capacities in FIG. 3, the capacity stabilities of the increasingly fluoro-substituted samples 32–35 of these more greatly Mg-substituted materials consistently exceeded those of the samples of FIG. 2.

EXAMPLE 6

Figure 4:
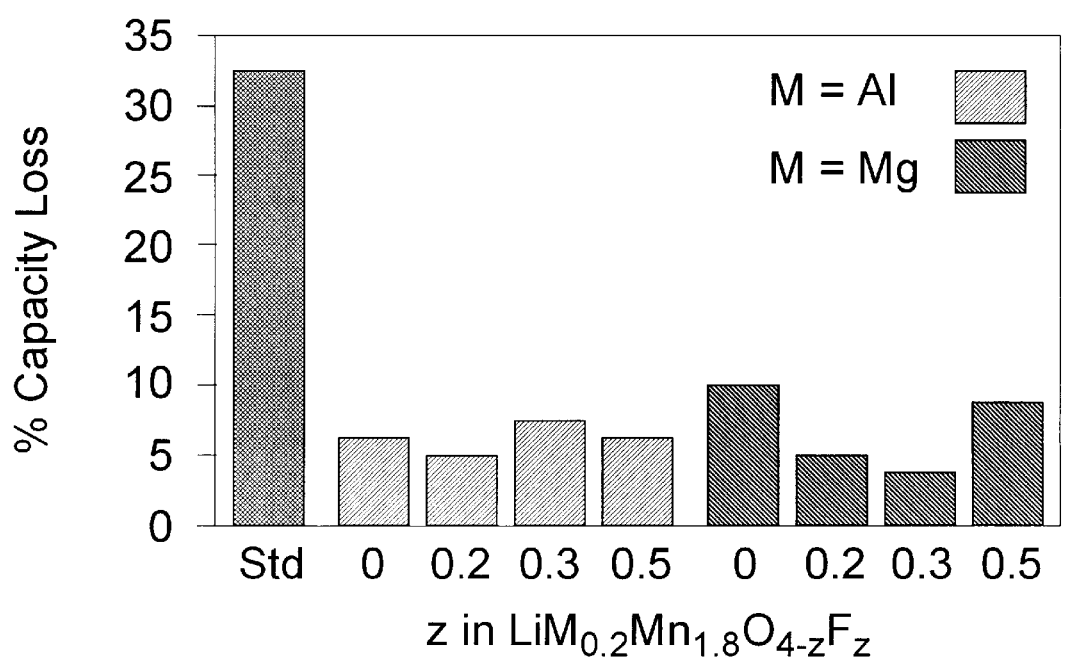
FIG. 4 is a bar-graph comparison of capacity loss over 120 cycles at elevated temperature for cells comprising a prior $Li_{1.05}Mn_{1.95}O_4$ electrode compound (std.), and earlier-studied $Li_{1+x}Al_yMn_{2-x-y}O_4$ electrode compounds and $Li_{1+x}Mg_yMn_{2-x-y}O_{4-z}F_z$ compounds of the present invention, each where $x=0$, $y=0.2$, and $z \leq 0.5$.

In order to further characterize the particular efficacy of the present invention materials in improving the stability of cell capacity at elevated operating temperatures, test cells respectively comprising, as a control standard, a preferred $Li_{1.05}Mn_{1.95}O_4$ compound used in prior cells, earlier-investigated $Li_{1.0}Al_{0.2}Mn_{1.8}O_{4-z}F_z$ electrode materials, and the similarly z-substituted $Li_{1.0}Mg_{0.2}Mn_{1.8}O_{4-z}F_z$ electrode materials of Example 4 were subjected to extended cycling at about 55° C., a temperature at which noticeable degradation of cell performance is commonly observed. Results of these tests appear, respectively, in FIG. 4 as bars indicating the comparative loss, on a percentage basis, of cell capacity over the test cycling period. As is apparent, the present invention material, particularly where z=0.2 to 0.3, contributes to a higher degree of capacity stability over extended cycling at elevated temperatures normally experienced in rechargeable battery usage.

It is expected that other embodiments of the present invention will become apparent to the skilled artisan in light of the foregoing description, and such variations are intended to be included within the scope of this invention as recited in the appended claims.

What is claimed is:

1. A lithium magnesium manganese oxy-fluoride compound having the formula, $Li_{1+x}Mg_yMn_{2-x-y}O_{4-z}F_z$, where $x \leq 0.2$, $0.1 \leq y \leq 0.3$, and $0.01 \leq z \leq 0.5$.

2. A compound according to claim 1 where $x \leq 0.2$, y=0.1, and $0.2 \leq z \leq 0.5$.

3. A compound according to claim 1 where $x \leq 0.2$, y=0.2, and $0.2 \leq z \leq 0.5$.

4. A rechargeable battery cell comprising a positive electrode, a negative electrode, and a separator disposed therebetween characterized in that said positive electrode comprises an intercalation compound having the general formula, $Li_{1+x}Mg_yMn_{2-x-y}O_{4-z}F_z$, where $x \leq 0.2$, $0.1 \leq y \leq 0.3$, and $0.01 \leq z \leq 0.5$.

5. A rechargeable battery cell according to claim 4 where $x \leq 0.2$, y=0.1, and $0.2 \leq z \leq 0.5$.

6. A rechargeable battery cell according to claim 4 where $x \leq 0.2$, y=0.2, and $0.2 \leq z \leq 0.5$.

* * * * *